(12) United States Patent
Kroeber et al.

(10) Patent No.: US 10,921,272 B2
(45) Date of Patent: Feb. 16, 2021

(54) APPARATUS AND METHOD FOR THE PHOTOTHERMAL QUALITY CONTROL OF GRAIN SIZE AND LAYER ADHESION OF A COMPONENT

(71) Applicant: Robert Bosch GmbH, Stuttgart (DE)

(72) Inventors: Volker Kroeber, Eberdingen (DE); Jochen Straehle, Weissach (DE); Katrin Buechner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 323 days.

(21) Appl. No.: 15/568,253

(22) PCT Filed: Mar. 8, 2016

(86) PCT No.: PCT/EP2016/054880
§ 371 (c)(1),
(2) Date: Oct. 20, 2017

(87) PCT Pub. No.: WO2016/169690
PCT Pub. Date: Oct. 27, 2016

(65) Prior Publication Data
US 2018/0149607 A1 May 31, 2018

(30) Foreign Application Priority Data

Apr. 24, 2015 (DE) .................... 10 2015 207 551.6

(51) Int. Cl.
*G01N 1/44* (2006.01)
*G01N 25/18* (2006.01)

(52) U.S. Cl.
CPC ............... *G01N 25/18* (2013.01); *G01N 1/44* (2013.01)

(58) Field of Classification Search
CPC .......... G01N 25/18; G01N 1/44; G01N 25/00; G01N 25/72
(Continued)

(56) References Cited

U.S. PATENT DOCUMENTS 4,792,683 A * 12/1988 Chang .................... G01N 25/72
250/334
5,586,824 A    12/1996 Barkyoumb et al.
(Continued)

FOREIGN PATENT DOCUMENTS

DE        2159783         8/1972
KR    20130095501 A       8/2013
(Continued)

OTHER PUBLICATIONS

International Search Report for Application No. PCT/EP2016/054880 dated Jun. 1, 2016 (English Translation, 3 pages).
(Continued)

*Primary Examiner* — Robert R Raevis
(74) *Attorney, Agent, or Firm* — Michael Best & Friedrich LLP

(57) ABSTRACT

Method (18, 19, 20, 21) for the quality control of a component (4, 4a, 4b, 4c, 4d, i, j, k), wherein the component (4, 4a, 4b, 4c, 4d, i, j, k) is heated (19) by an energy source (5, 5c, 5d), the intensity of which is periodically modulated (18) at at least one frequency ω, and wherein the amplitude A and/or the phase φ of a heat wave (81) which is modulated at the same frequency ω and is emitted by the component (4, 4a, 4b, 4c, 4d, i, j, k) is/are recorded (20), wherein the particle sized of the material, from which the component (4, 4a, 4b, 4c, 4d, i, j, k) is constructed, and/or the adhesion properties F of a functional layer (42) applied to the com-
(Continued)

ponent (4, 4a, 4b, 4c, 4d, *i, j, k*) are evaluated (21) from the amplitude A and/or from the phase φ. Apparatus (100) for carrying out the method.

8 Claims, 7 Drawing Sheets

(58) Field of Classification Search
    USPC ............... 73/104, 150 R, 150 A; 374/45–57
    See application file for complete search history.

(56) References Cited

U.S. PATENT DOCUMENTS

| | | | | |
|---|---|---|---|---|
| 5,652,042 | A * | 7/1997 | Kawakita | H01B 1/22 252/511 |
| 6,516,084 | B2 | 2/2003 | Shepard | |
| 2003/0143402 | A1 * | 7/2003 | Hon | C23C 16/30 428/408 |
| 2012/0080764 | A1 * | 4/2012 | Xue | B81B 7/0074 257/417 |
| 2014/0314121 | A1 * | 10/2014 | Matsumoto | G01J 5/0096 374/130 |
| 2014/0339429 | A1 * | 11/2014 | Matsumoto | G01N 25/72 250/341.6 |
| 2017/0074803 | A1 * | 3/2017 | Takayanagi | G01N 21/8422 |

FOREIGN PATENT DOCUMENTS

| | | |
|---|---|---|
| WO | 0011450 | 3/2000 |
| WO | 2005026404 | 3/2005 |

OTHER PUBLICATIONS

Wu, D. et al., "Phase-sensitive modulation thermography and its applications for NDE," Optical Sensing 2, Bd. 3056, Apr. 4, 1997, XP055274122.

* cited by examiner

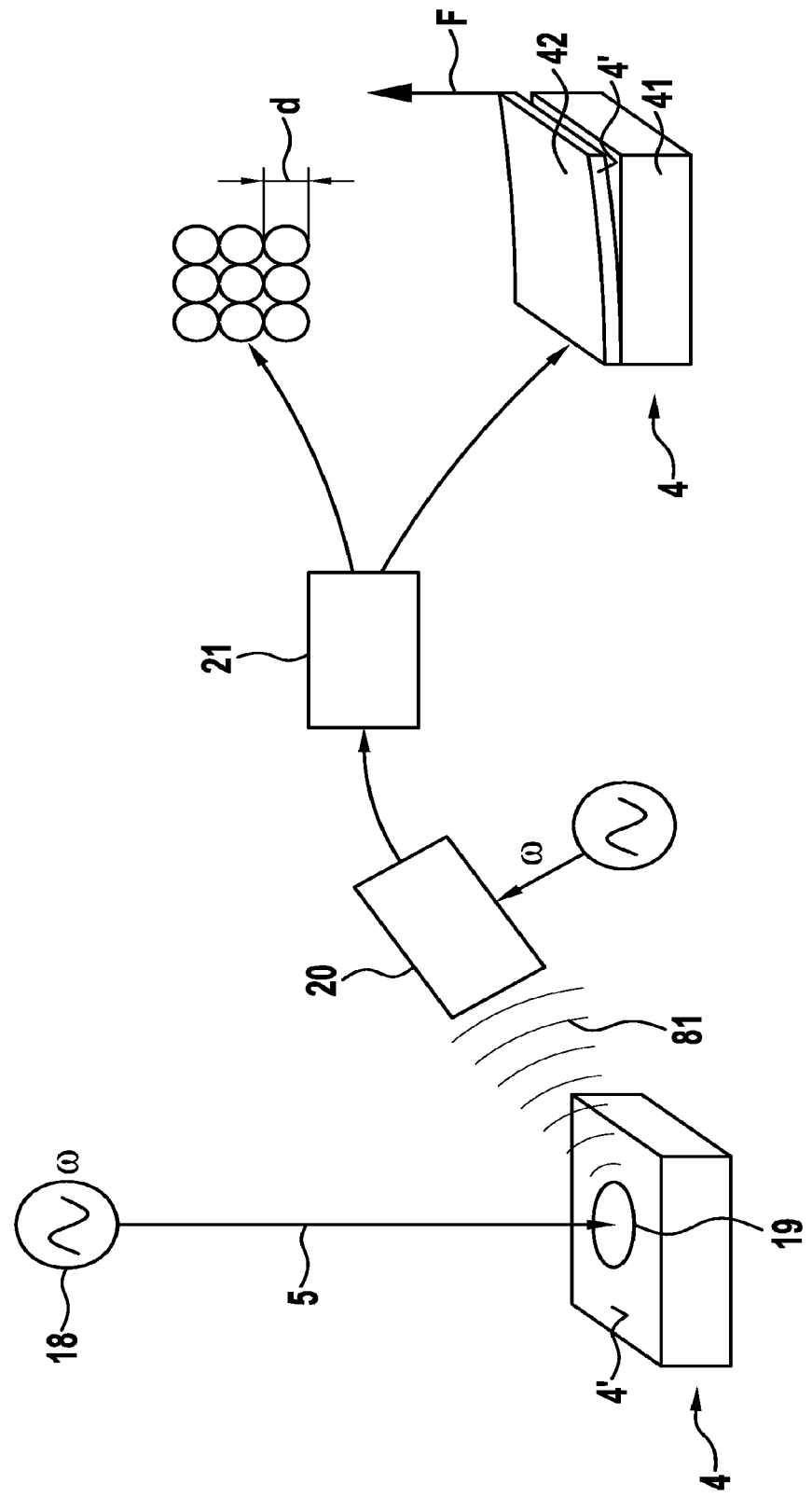

APPARATUS AND METHOD FOR THE PHOTOTHERMAL QUALITY CONTROL OF GRAIN SIZE AND LAYER ADHESION OF A COMPONENT

BACKGROUND OF THE INVENTION

The present invention relates to a photothermal method for the nondestructive quality control a component synchronously with the manufacturing process, and to an apparatus for carrying out the method.

Because of the increasing pressures in diesel injection systems, the predominantly metal components are being stressed increasingly. In this case, the homogeneity and the fine granularity of the structure play an important role. Coarse-grained components which are exposed to a high pressure stress components, for example the valve piece of a magnetic injector, may form cracks and ultimately break. Functionality of the injector is then no longer ensured. Highly stressed components are often additionally treated with functional layers, for example with carbon coatings which minimize wear. This occasionally results in poor connection between the carbon layer and the metal, which can lead to the layer peeling off and therefore to a change in the injection behavior.

It has hitherto been possible to check both the granularity of the structure and the adhesion of a functional layer only destructively, and therefore only by sampling. In order to assess the structure, a metallurgical cutting must be taken and subsequently evaluated optically, for example with the aid of a light microscope. Microphotographic methods for determining the recognizable ferrite or austenite grain size of steels are set out, for example, in the standard DIN EN ISO 643. The adhesion of a functional layer can only be checked by microindentations and related inspection methods, which damage the layer at least locally. In VDI guideline 3198, which relates to CVD and PVD coating to apply wear protection layers onto reforming tools, the Rockwell indentation test for measuring the adhesion class of a functional layer is described.

SUMMARY OF THE INVENTION

It is therefore the object of the invention to provide a method for the quality control of a component, with which both the granularity of the material and the adhesion properties of a functional layer can be monitored nondestructively.

In the scope of the invention, a method for the quality control of a component has been developed. In this case, the component is heated by an energy source which is intensity-modulated periodically with at least one frequency $\omega$. The amplitude A and/or the phase $\varphi$ of a heat wave emitted by the component and modulated with the same frequency $\omega$ is registered.

The energy source may, for example, heat the component by supplying heat directly to it. It is however also possible for light for example, in particular laser light, to be shone onto the component and converted into heat there by absorption. In this case, the amplitude of the periodic temperature variation on the surface of the component depends on the frequency f of the incident light; it is typically proportional to $f^{1/2}$. The absolute value of the temperature on the surface of the component depends on the thermal diffusion length, the incident power, the thermal conductivity of the component and the frequency f. For typical values of the operating parameters and steel as a material, with a modulation frequency $\omega$ of 1000 Hz an amplitude of the temperature variation on the surface of the component of less than 1° C. is typically obtained.

According to the invention, the grain size d of the material of which the component is made and/or the adhesion properties F of a functional layer applied on the component are evaluated from the amplitude A and/or the phase $\varphi$.

The grain size d may, for example, be specified in a length unit. The adhesion properties F of a functional layer applied on the component may, for example, be specified as the force F which is required in order to remove the functional layer from the component.

It has been discovered that both the grain size d and the adhesion properties F have a sufficiently great effect on the thermal conduction of the component that they can be recorded in a photothermal way both nondestructively and synchronously with the production series. In this way, the previous monitoring of manufactured components by sampling can be widened to 100% monitoring.

The heat introduced into the component penetrates into the material and subsequently emerges therefrom at least partially in the form of a heat wave emitted in all directions. This process is retarded by the thermal resistance of the material. Correspondingly, the emitted heat wave is phase-shifted relative to the heating, which may for example be carried out using a laser beam. Furthermore, a part of the heat introduced may also be lost; this part then no longer contributes to the amplitude A of the heat wave.

Advantageously, a region with a spatial extent, for example a diameter, of at most 3 µm on the component surface is heated locally.

There is then a defined starting point, from which the heat wave propagates in the component.

Whether the measurement is sensitive primarily to the grain size d of the material or to the adhesion properties F of a functional layer depends on the penetration depth of the heat wave coming from the place of the heating into the component. This penetration depth is dependent on the frequency of the heat wave, which corresponds to the modulation frequency $\omega$ of the energy source. Frequencies of between 25 and 400 Hz are particularly suitable for measuring the grain size of the material, since the heat wave reaches sufficiently far into the component at this frequency. Frequencies of between 600 and 2000 Hz are particularly suitable for measuring the adhesion properties F of a functional layer. The heat wave then remains essentially on the surface of the component.

For testing the adhesion properties F of a functional layer, it is therefore not actually necessary for the component to be internally metallic or even thermally conductive. So that the grain size of the material of the component can also be measured, this material should be at least thermally conductive enough for a heat wave to be able to propagate in it starting from the place of local heating.

Advantageously, the temperature of the component is modulated periodically on the basis of two different basic temperatures $T_1$ and $T_2$. Amplitudes $A(T_1)$ and $A(T_2)$ and/or phases $\varphi(T_1)$ and $\varphi(T_2)$ are then then respectively registered for the two temperatures $T_1$ and $T_2$. By means of the temperature dependency of the amplitudes or phases, it is then possible to deduce whether these amplitudes or phases are actually a measure of the sought grain size d or the sought adhesion properties F. For example, an absolute or relative difference $\Delta A(T_2-T_1)$ between the amplitudes $A(T_1)$ and $A(T_2)$ and/or an absolute or relative difference $\Delta\varphi(T_2-T_1)$ between the phases $\varphi(T_1)$ and $\varphi(T_2)$, which lies above or below a predetermined threshold S1, may be evaluated as an indication that the amplitude A or the phase φ at the frequency ω is essentially independent of the sought adhesion properties F or the sought grain size d: thus, for example, the influence of the adhesion properties F of a functional layer on the amplitude A and phase φ of the heat wave is only weakly temperature-dependent. If the registered amplitudes A or phases φ vary very greatly with the temperature, this conversely means that they are probably not primarily caused by the adhesion properties F of the functional layer.

Furthermore, the thermal conduction properties of coarse-grained and fine-grained structures are differently temperature-dependent. In a fine-grained structure, there are very many grain boundaries, so that the thermal conduction is dominated by the effects on grain boundaries. These effects are almost temperature-independent. Thus, if the amplitudes A or phases φ are significantly temperature-dependent, a conclusion drawn during the evaluation that the structure is fine-grained is very likely to be wrong and should therefore be rejected. In a coarse-grained structure, conversely, there are relatively few grain boundaries so that the thermal conduction inside the structure dominates. This thermal conduction is highly temperature-dependent. A temperature independency of the registered amplitudes A or phases φ therefore does not fit with the conclusion that the structure is coarse-grained.

Such contradictions are due to the fact that, in the photothermal measurement signal, the respectively sought effects are superimposed with other effects, for example the surface condition and edge effects. They are often an indicator that, for the specific application, the penetration depth of the heat wave, and therefore the modulation frequency ω of the heating, has not been selected optimally. The penetration depth of the heat wave as a function of the frequency is material-dependent. Furthermore, the effect of the grain boundaries also has interfering effects from the structure itself, for example from its long-range crystalline order, superimposed on it. If these interfering effects dominate the measurement signal, this will be manifested by the fact that the phase signal is much more temperature-dependent than would be expected even for a coarse structure. This is also an indicator that a non-optimal modulation frequency ω has been selected, since whether it is primarily the structure, for example its long-range order, or the grain boundaries that have been interrogated in the material is likewise frequency-dependent.

In one particularly advantageous configuration of the invention, the energy source is modulated with at least two different frequencies $\omega_1$ and $\omega_2$ and/or with a superposition of these frequencies $\omega_1$ and $\omega_2$. Amplitudes $A(\omega_1)$, $A(\omega_2)$ and/or $A(\omega_1 \pm \omega_2)$ and/or phases $\varphi(\omega_1)$, $\varphi(\omega_2)$ and/or $\varphi(\omega_1 \pm \omega_2)$ are respectively registered for the two frequencies $\omega_1$ and $\omega_2$ and/or for a superposition of these frequencies $\omega_1$ and $\omega_2$. By means of the frequency dependency of the amplitudes A and/or phases φ, for example by means of the slope of the phase φ as a function of the frequency ω, different contributions to the photothermal measurement signal can likewise be distinguished from one another. It is thus advantageous to incorporate the absolute and/or relative difference ΔA between the amplitudes $A(\omega_1)$, $A(\omega_2)$ and/or $A(\omega_1 \pm \omega_2)$ and/or the absolute and/or relative difference Δφ between the phases $\varphi(\omega_1)$, $\varphi(\omega_2)$ and/or $\varphi(\omega_1 \pm \omega_2)$ into the evaluation of the sought adhesion properties F or the sought grain size d. Evaluation of a slope may give a better correlation than evaluation of an absolute value. If the measurement data are affected by an additive offset, for example, this drops out during determination of the slope.

The reason for developing the method was the need for continuous quality control in mass production of components which are always the same. For this application, it is not primarily important to obtain absolute values for adhesion properties F or the grain size d. Rather, it is important to monitor a consistent quality and promptly identify sporadic or systematic deviations from a specification. In one particularly advantageous configuration of the invention, therefore, at least one reference value $A_R$ for the amplitude A and/or at least one reference value $\varphi_R$ for the phase φ of the heat wave is initially determined on a component for which the grain size d and/or the adhesion properties F are known. The grain size d and/or the adhesion properties F are subsequently evaluated for at least one further component from comparison of the amplitude A and/or phase φ determined on this component with the reference value $A_R$ and/or $\varphi_R$. If the amplitude A and/or the phase φ correspond within a predetermined tolerance interval to the reference values $A_R$ or $\varphi_R$, then with otherwise identical measurement conditions it may be assumed that the component has the same grain size d and/or the same adhesion properties F of the functional layer as the component used when determining the reference values $A_R$ and/or $\varphi_R$. A single calibration at the start of the mass production can thus be used to test all the components in the series, in order, besides obvious rejects, also to identify a slow progressive drift of the component properties from the specification.

In another particularly advantageous configuration of the invention, the amplitude A and/or the phase φ is determined under identical conditions on a multiplicity of nominally identically manufactured components. An absolute or relative deviation of the amplitude A(i) and/or phase φ(i) determined on one component i from a mean value or median over all the components, which exceeds a predetermined threshold value S2, is evaluated as an indication that the component i deviates significantly from the other components in respect of the grain size and/or the adhesion properties. Such a conclusion about individual anomalies is possible even without calibration at the start of mass production.

In another particularly advantageous configuration of the invention, a frequency ω is selected at which the absolute or relative difference between the amplitudes A(j) and A(k) and/or between the phases φ(j) and φ(k) determined on two components j and k which are known to have different grain sizes and/or adhesion properties is maximal and/or exceeds a predetermined threshold value S3. This ensures that a variation in the grain size or in the adhesion properties affects the measurement signal to a sufficient extent. The effects used for the measurement are in principle small effects which result, for example, in phases of from a few tenths of a degree to at most about 2 degrees.

In the scope of the invention, an apparatus for carrying out the method according to the invention has also been developed. This comprises at least one laser for local heating of the component, means for periodic modulation of the light intensity shone onto the component, and at least one frequency-sensitive detector for the infrared radiation emitted by the component.

Instead of a laser, it is also possible to use other energy sources which act locally on the component and can be modulated in their intensity with the desired frequency. For example, intense lamplight or another type of radiation may be used. The heat may, however, also be introduced into the component for example by thermal conduction by means of an electrical heating element, the current applied to which is modulated as a function of time.

According to the invention, means for modifying the basic temperature of the component from a first value $T_1$ to a second value $T_2$ are provided, in such a way that congruent regions on the surface of the component can respectively be heated locally on the basis of the two basic temperatures $T_1$ and $T_2$.

It has been discovered that there are then identical conditions for propagation of the heat wave in the component at the two temperatures $T_1$ and $T_2$ starting from the heated region. The sometimes only weak temperature dependency of the measurement signal does not then have interfering effects superimposed on it, such as may be caused for example by different geometries or surface conditions of the component. Depending on the complexity of the shape of the component, it is particularly advantageous for the locally heatable regions on the component surface to be congruent to within a tolerance of at most 100 micrometers.

The apparatus may, for example, comprise a Peltier element and/or a hot and/or cold bath for modifying the basic temperature of the component. In this case, the basic temperature of the component may for example be monitored by means of a connected temperature sensor, for instance a thermocouple.

If within the scope of mass production the cycle time between two successive components is long enough, after the measurement at the temperature $T_1$ the temperature may be modified and, after the temperature $T_2$ has been stably reached, the second measurement may be carried out without it being necessary to move the component in the meantime for this. It is then particularly simple, on the basis of the two temperatures $T_1$ and $T_2$, to locally heat congruent regions by operating the energy source respectively in an identical way at the two temperatures.

The measurement may be accelerated by the measurement at the temperature $T_2$ taking place at a position in the production line lying further downstream. The time which the component takes to reach this position in the scope of normal running of the production line may be used for modifying the temperature from $T_1$ to $T_2$. The regions respectively heated locally at the two temperatures $T_1$ and $T_2$ may, for example, be made congruent by the forward feed of the production line taking place with a sufficient accuracy and the components advantageously being coupled firmly to the production line. It is, however, also possible for example to use calibration marks applied to the components or similarly acting means, in order to find the region heated locally at the first temperature $T_1$ again after having moved to the second measurement position and having reached the temperature $T_2$.

In general, it is sufficient to locally heat only one region on the component surface. If the grain size, or the adhesion properties of the functional layer, is distributed inhomogeneously over the component, it may be advantageous to locally heat a plurality of separated regions on the component surface successively.

BRIEF DESCRIPTION OF THE DRAWINGS

Further measures which improve the invention will be presented in more detail below together with the description of the preferred exemplary embodiments of the invention with the aid of figures.

FIG. 1 shows an outline diagram of an exemplary embodiment of the method according to the invention.

DETAILED DESCRIPTION

FIG. 1 outlines an exemplary embodiment of the method according to the invention. An energy source 5 is modulated periodically with a frequency $\omega$ in step 18. In step 19, the energy source 5 locally heats the surface 4' of a component 4. The component 4 is thereby stimulated to emit a heat wave 81, which is modulated with the same frequency $\omega$. In step 20, the amplitude A and/or the phase $\varphi$ of the heat wave 81 are measured frequency-sensitively. In step 21, the grain size d of the component 4 is evaluated from the amplitude A and/or the phase $\varphi$, and/or the adhesion properties F of a functional layer 42 applied on the component 4 are evaluated from the amplitude A and/or the phase $\varphi$. In this exemplary embodiment, the functional layer 42 is applied on the surface 4' of the component 4.

Figure 2A:
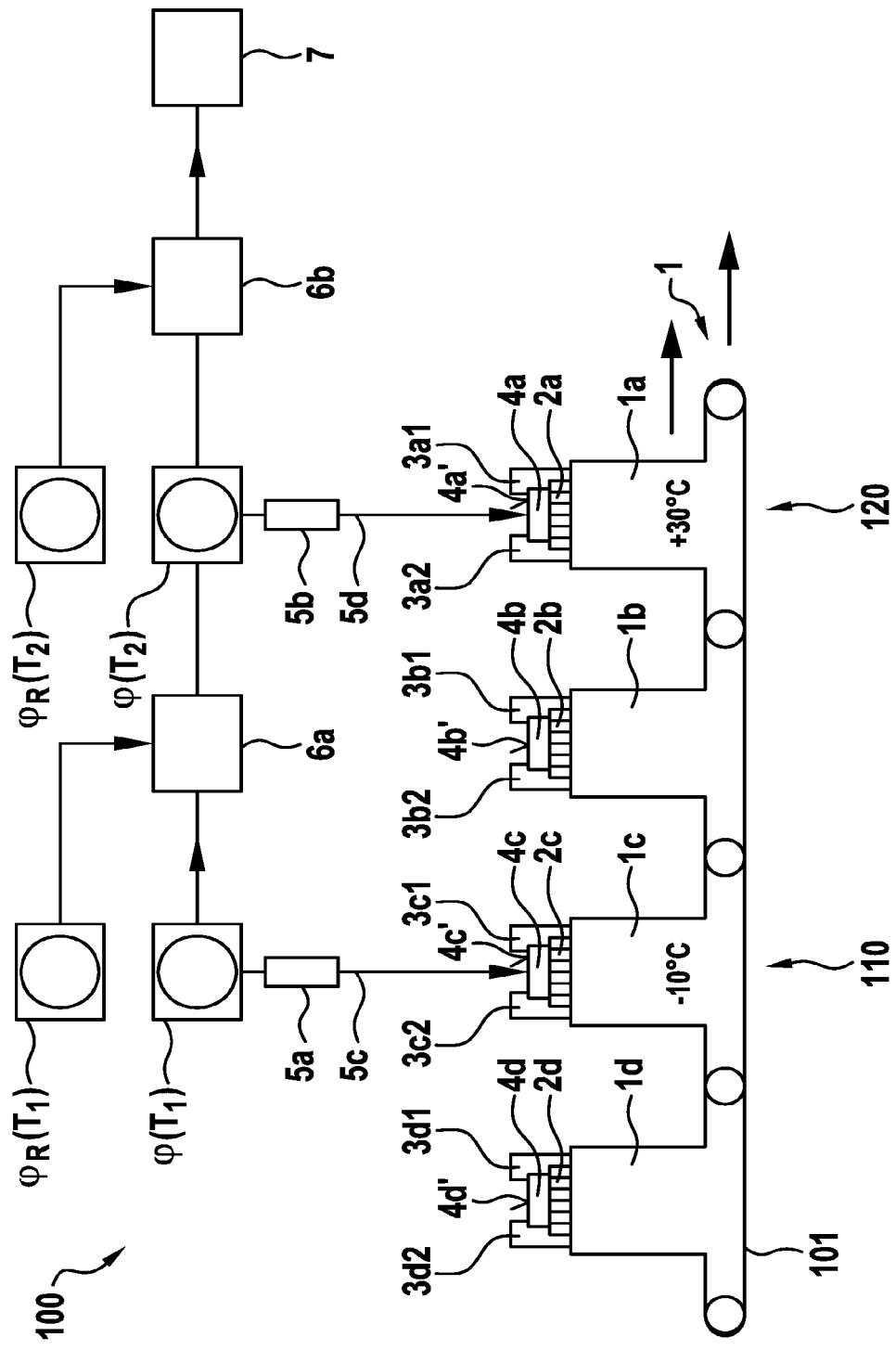
FIGS. 2a-2d show an exemplary embodiment of an apparatus according to the invention.

FIG. 2a shows an exemplary embodiment of the apparatus 100 according to the invention. The production line 1 contains a conveyor belt 101. The conveyor belt 101 carries components 4a, 4b, 4c and 4d from production at a constant rate in the direction of the arrow. To this end, the conveyor belt 101 comprises holding positions 1a, 1b, 1c and 1d, which may be raised out of it. Peltier elements 2a, 2b, 2c and 2d are respectively arranged on the holding positions 1a, 1b, 1c and 1d. The components 4a, 4b, 4c and 4d lie on these Peltier elements. The components are connected firmly by means of retainers 3a1, 3a2, 3b1, 3b2, 3c1, 3c2, 3d1 and 3d2 to the Peltier element on which they lie.

At a first measurement position 110, the apparatus 100 comprises a measurement head 5a, which respectively heats the components 4a, 4b, 4c and 4d locally with a laser beam 5c in step 19 of the method, and in step 20 of the method registers the heat wave 81 respectively emerging from the components 4a, 4b, 4c and 4d. The Peltier elements 2a, 2b, 2c and 2d are respectively adjusted in such a way that the component 4a, 4b, 4c, 4d reaches a temperature of −10° C. before it is locally heated by the laser beam 5c. The heat wave 81 which results during the local heating 19 starting from this basic temperature $T_1$ is shifted relative to the excitation with the laser beam 5c by a phase $\varphi(T_1)$. In step 21 of the method, the phase $\varphi(T_1)$ is compared with a reference value $\varphi_R(T_1)$ in a first comparator 6a. If, on the basis of the deviation $\Delta\varphi$ between the measured phase $\varphi(T_1)$ and the reference value $\varphi_R(T_1)$, it is already established that the component 4a, 4b, 4c, 4d is defective, then the latter is correspondingly marked and/or removed from the production line 1. Otherwise, the component 4a, 4b, 4c, 4d continues on in the conveying direction of the conveyor belt 101 from left to right to the second measurement position 120, at which a further measurement head 5b is installed. During this movement, the Peltier element 2a, 2b, 2c, 2d is switched from cooling to heating, so that the component 4a, 4b, 4c, 4d has reached a temperature $T_2$ of +30° C. when it has arrived at the second measurement position 120. At this second measurement position 120, again according to step 19 of the method, the component 4a, 4b, 4c, 4d is locally heated by the measurement head 5b using a laser beam 5d starting from the new basic temperature $T_2$. In step 20 of the method, the phase $\varphi(T_2)$ of the heat wave 81 emerging from the component 4a, 4b, 4c, 4d is measured. The phase $\varphi(T_2)$ is compared in step 21 of the method with a reference value $\varphi_R(T_2)$ by a second comparator 6b. A decision component 7 receives the results delivered by the two comparators 6a and 6b, and evaluates them together as to whether the component 4a, 4b, 4c, 4d has satisfied the specification and remains in the production line 1, or whether it is classified as defective.

Figure 2B:
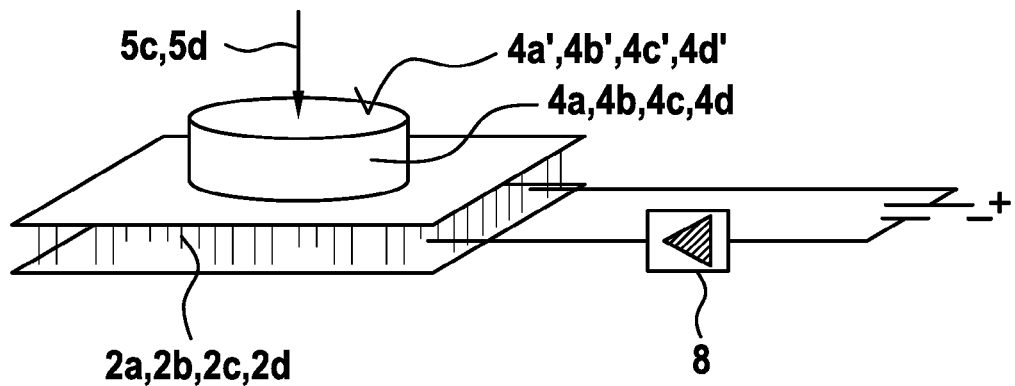

FIG. 2b illustrates the arrangement of the components 4a, 4b, 4c and 4d on the Peltier elements 2a, 2b, 2c and 2d. The Peltier element may be supplied with a current by means of an adjustable current source 8. This flow of current either applies heat to the component 4a, 4b, 4c, 4d or draws heat therefrom. With the Peltier element 2a, 2b, 2c, 2d, the basic temperature $T_1$, $T_2$ of the component 4a, 4b, 4c, 4d is established. Starting from this basic temperature $T_1$, $T_2$, the component 4a, 4b, 4c, 4d is locally heated by the laser beams 5c and 5d.

Figure 2C:
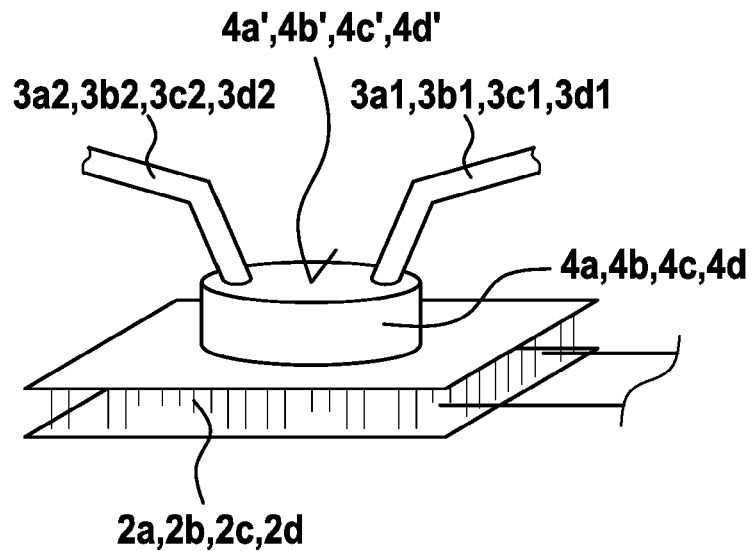

FIG. 2c illustrates the way in which a stable thermal contact may be achieved between the component 4a, 4b, 4c, 4d and the Peltier element 2a, 2b, 2c, 2d. The component 4a, 4b, 4c, 4d is pressed by a retainer (pressing pin) 3a1, 3a2, 3b1, 3b2, 3c1, 3c2, 3d1 and 3d2 against the Peltier element 2a, 2b, 2c, 2d.

Figure 2D:
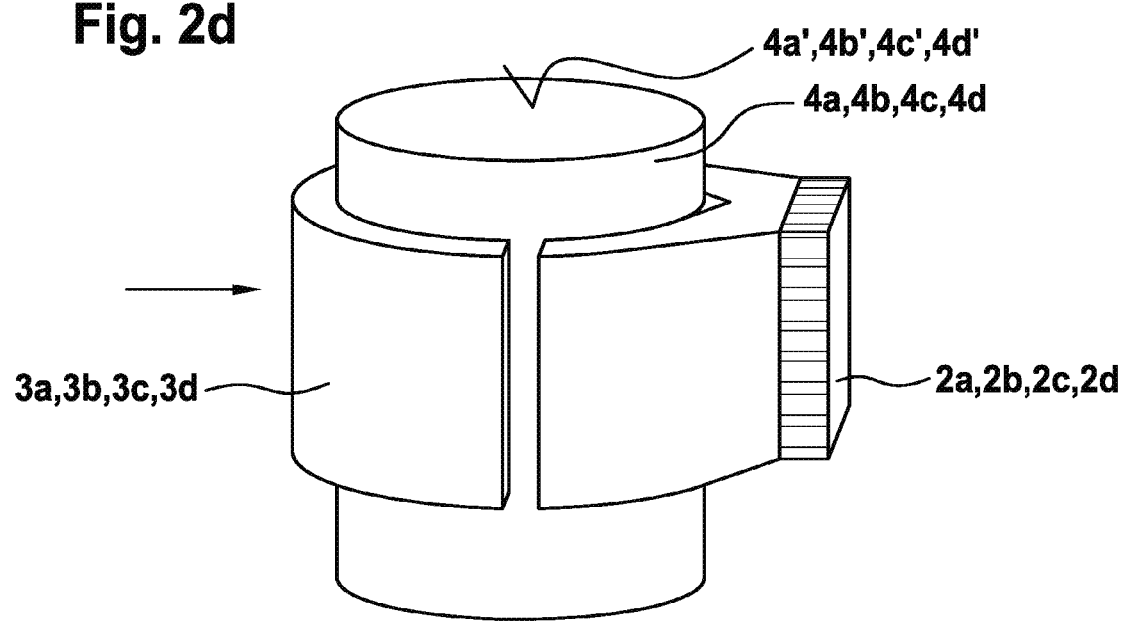

FIG. 2d illustrates a further possible way of achieving stable thermal coupling of the component 4a, 4b, 4c, 4d to the Peltier element 2a, 2b, 2c, 2d. The Peltier element 2a, 2b, 2c, 2d is in this case thermally conductively connected to a likewise thermally conductive clip 3a, 3b, 3c, 3d into which the component 4a, 4b, 4c, 4d may be fitted, for example by a robot gripper. The solid clip 3a, 3b, 3c, 3d in this case acts as a hot or cold bath. It may, for example, consist of copper. Ideally, the component 4a, 4b, 4c, 4d is pressed in a suitable shape onto the inner side of the clip 3a, 3b, 3c, 3d. This may, for example, be done by configuring the clip 3a, 3b, 3c, 3d resiliently. To this end, however, it is also possible for example to provide hydraulic fixing pins or clamping jaws. The clip 3a, 3b, 3c, 3d should only have minimal temperature variations, so as not to falsify the interpretation of the results. Monitoring with a temperature sensor is therefore expedient.

Figure 3A:
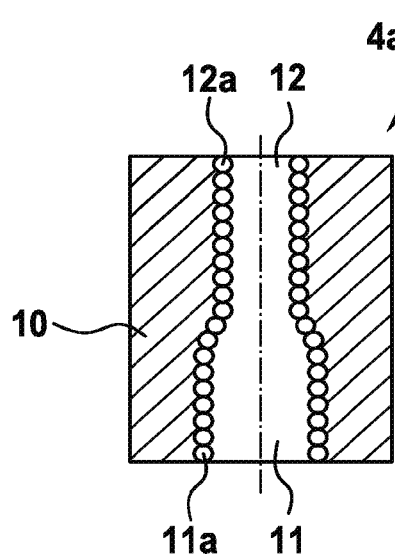
FIGS. 3a-3b show detrimental effects of an excessively coarse-grained structure on the component properties.
Figure 3B:
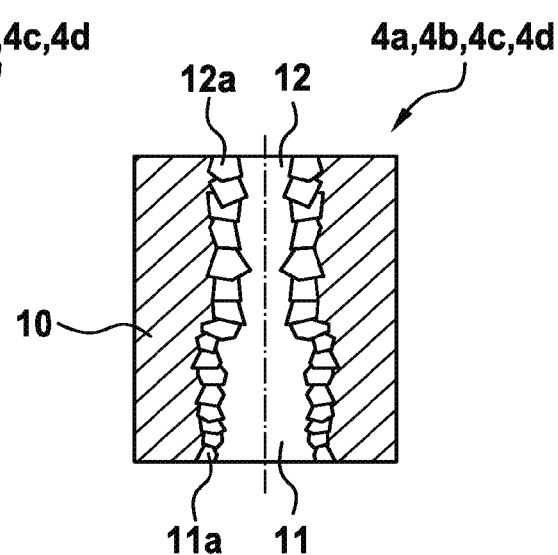

FIG. 3 illustrates the detrimental effect which a coarse-grained structure has on properties of the component 4a, 4b, 4c, 4d. FIG. 3a represents a component 4a, 4b, 4c, 4d with a fine-grained structure; FIG. 3b represents a component with a coarse-grained structure. The component 4a, 4b, 4c, 4d is in each case a metal base body 10 having a further bore 11, which is continued by a tapered bore 12. The grain structure is outlined by way of example in the wall 11a of the further bore 11 and in the wall 12a of the tapered bore 12. It can firstly be seen that, with a fine-grained structure, the desired shape of the bore 12 can be reproduced much more precisely than with a coarse-grained structure. The coarse-grained structure furthermore has many sharp edges, which may be starting points for cracks. These cracks may propagate through the base body 10, so that the component 4a, 4b, 4c, 4d ultimately fails.

Figure 4:
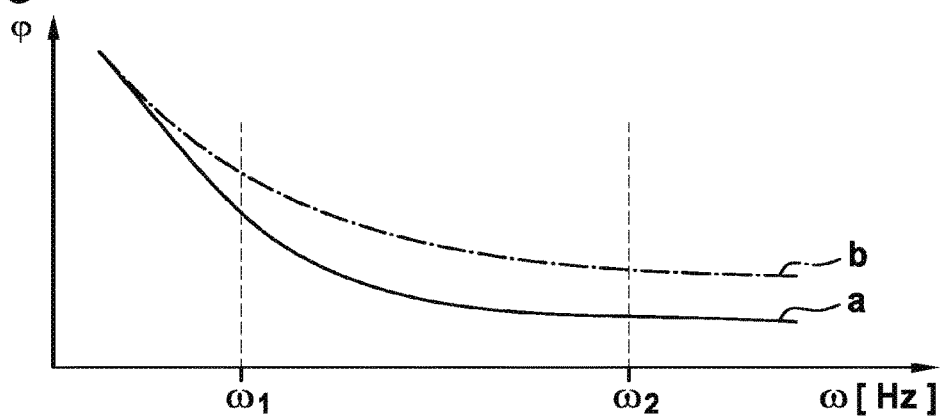
FIG. 4 shows the profile of the phase $\varphi$ as a function of the frequency $\omega$ for the structure shown in FIG. 2.

FIG. 4 shows the frequency excursion of the phase $\varphi$ of a heat wave 81, which results in the case of periodic local heating 19 of the components 4a, 4b, 4c, 4d shown in FIG. 3. Curve a shows the frequency excursion for the component 4a, 4b, 4c, 4d shown in FIG. 3a with a fine-grained structure. Curve b shows the frequency excursion for the component 4a, 4b, 4c, 4d shown in FIG. 3b with a coarse-grained structure. By measurements at the two frequencies $\omega_1$ and $\omega_2$ indicated in step 20 of the method and subsequent evaluation in step 21 of the method, the two structures can be distinguished clearly from one another.

Figure 5A:
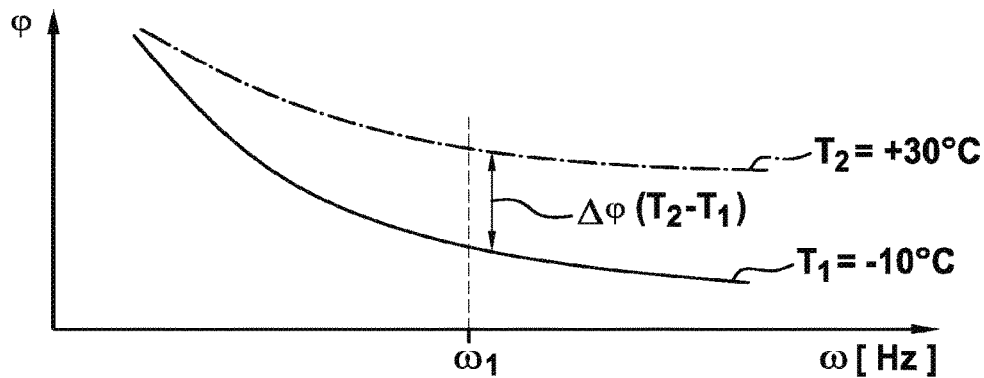
FIGS. 5a-5b show the temperature dependency of the frequency excursion of the phase $\varphi$ for the structure shown in FIG. 2.
Figure 5B:
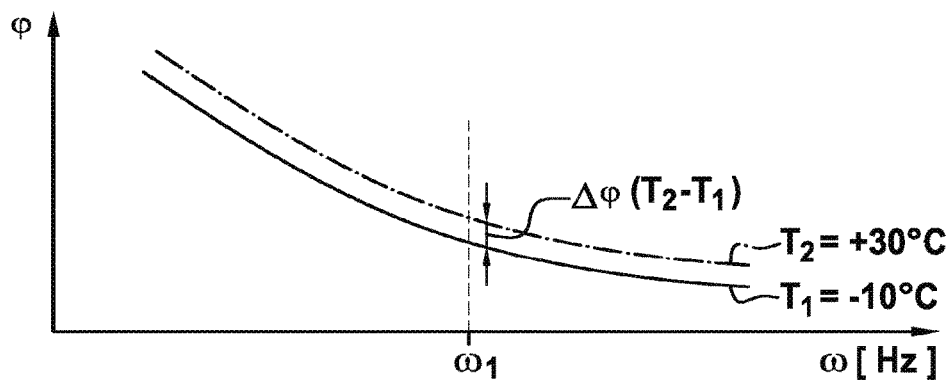

FIG. 5 shows the frequency excursions of the phase $\varphi$ for the components 4a, 4b, 4c, 4d outlined in FIG. 3, respectively for a first measurement temperature $T_1$ of −10° C. and for a second measurement temperature $T_2$ of +30° C. FIG. 5a relates to the component 4a, 4b, 4c, 4d shown in FIG. 3b with the coarse-grained structure. FIG. 5b relates to the component 4a, 4b, 4c, 4d shown in FIG. 3a with the fine-grained structure. It can be seen clearly that, with the same excitation frequency $\omega_1$, the phase variation $\Delta\varphi(T_2-T_1)$ caused by the temperature variation from $T_1$ to $T_2$ turns out to be much less for the fine-grained structure of the component 4a, 4b, 4c, 4d according to FIG. 3a than for the coarse-grained structure of the component 4a, 4b, 4c, 4d according to FIG. 3b. The reason for this is that the thermal conduction is dominated by the grain boundary effects in the fine-grained structure because of the multiplicity of grain boundaries; these effects are almost independent of temperature. In a coarse-grained structure, these effects are less significant since there are far fewer grain boundaries.

Figure 6A:
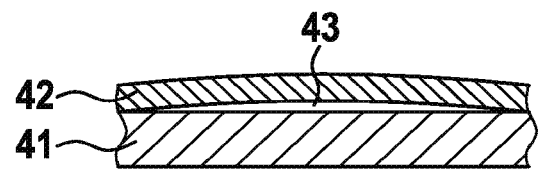
FIGS. 6a-6c show a model of the effect of the adhesion properties of functional layers and expected frequency excursion of the measured phase $\varphi$.

FIG. 6 shows, in a simplified form, the way in which poor adhesion F of a functional layer 42 on a metal base material 41 differs from good adhesion F. FIG. 6a shows poor adhesion F. The functional layer 42 does not lie flat on the base material 41, but bulges. Formed between the functional layer 42 and the base material 41, there is in this case an intermediate space 43, which transfers an amount of heat coupled locally into the surface of the functional layer 42 less well than direct contact of the functional layer 42 with the base material 41.

Figure 6B:
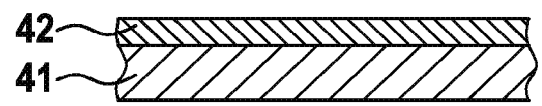

FIG. 6b shows good adhesion F of the functional layer 42 on the base material 41. The functional layer 42 lies flat, so that the heat coupled into the surface of the functional layer 42 can be transferred directly through the adjacent base material 41.

Figure 6C:
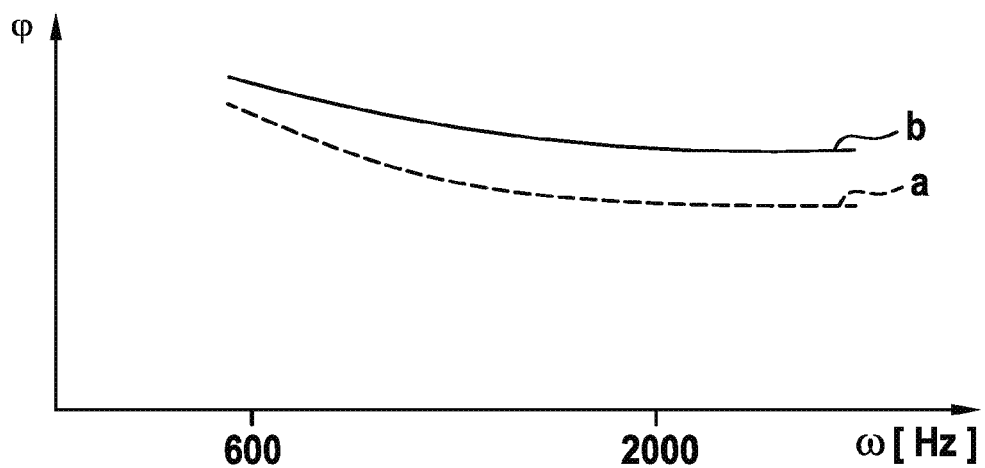

FIG. 6c shows the way in which the frequency excursions $\varphi(\omega)$ of the phase of a heat wave 81, which has been produced by local heating 19, differ from one another for the components 4a, 4b, 4c, 4d outlined in FIGS. 6a and 6b. Curve a relates to the component 4a, 4b, 4c, 4d outlined in FIG. 6a. Curve b relates to the component 4a, 4b, 4c, 4d outlined in FIG. 6b. In the case of poor adhesion F of the functional layer 42, the phase $\varphi$ is constantly less than in the case of good adhesion F of the functional layer 42, and it varies much more strongly with the frequency $\omega$. This is because the poorly thermally conductive intermediate space 43 transmits the heat coupled into the functional layer 42 to the base material 41 only with a time delay.

FIG. 7 shows various application examples for components which consist of a base material 41 with a functional layer 42 of carbon. In each case, the most strongly stressed regions of the metal base material 41 are treated with the functional layer 42.

Figure 7A:
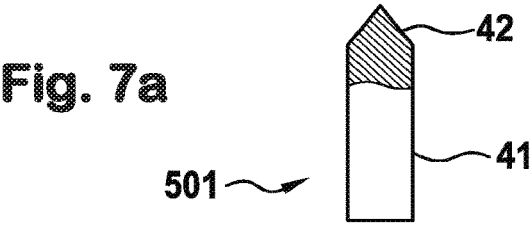
FIGS. 7a-7g show application examples of metal components treated with functional layers.

FIG. 7a shows a nozzle needle 501. This is used in an injection nozzle in an injector. By the stroke movement of the nozzle needle 501, fuel is injected into a combustion space of a diesel engine through injection holes in the nozzle body, which forms the mating piece for the nozzle body 501 and is not indicated in FIG. 7a. The functional layer 42 of carbon prevents premature wear of the nozzle needle 501 when pushing into the nozzle body.

Figure 7B:
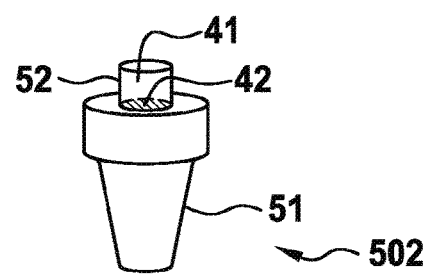

FIG. 7b shows a valve piece 502 for use in a magnetic injector, which is the central element for hydraulic control of the nozzle needle 501. The valve piece 502 comprises a plunger 51 and an armature 52. The armature 52 is moved by a magnet (not indicated in FIG. 7b) and determines the movement of the plunger 51. The plunger 51 in turn presses on the nozzle needle 501. The functional layer 42 of carbon on the lower side of the armature 52 prevents premature wear of the armature 52 when striking the plunger 51.

Figure 7C:
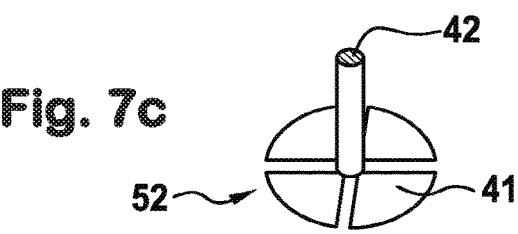

FIG. 7c shows the armature 52 in detail and in the reverse orientation compared with FIG. 7b. The magnetic injector with the armature 52 is a control valve, which is actuated by the magnets (not indicated in FIG. 7c) arranged above the armature 52 (in the orientation according to FIG. 7c). In this case, a quantity of fuel is let through and the fuel pressure partially decreases. If the magnet is not supplied with current, the armature 52 is pressed back into its seat by a spring (not indicated in FIG. 7c). The control valve is then closed, and the fuel pressure can then build up again. In a similar way to FIG. 7b, the functional layer 42 of carbon prevents premature wear of the armature 52 when striking the plunger 51.

Figure 7D:

FIG. 7d shows a roller shoe 503 for use as a guide element in the drive mechanism of a high-pressure diesel pump. The roller shoe 503 guides in the half-shells 53 a metal roller (not indicated in FIG. 7d) which runs on a cam. The movement of the roller up and down on the cam generates a stroke movement, which is used for the pressure build-up. The functional layer 42 of carbon on the half-shells 53 ensures that the metal roller can slide in the half-shells 53 almost without wear.

Figure 7E:
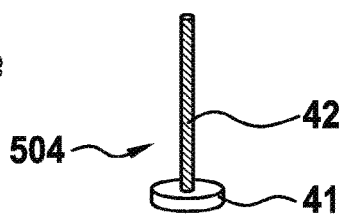

FIG. 7e shows a valve plunger 504 for use in the high-pressure region of a high-pressure diesel pump. The valve plunger 504 is moved up and down by the stroke movement of the roller shoe 503, and controls the feed into the high-pressure accumulator. The functional layer 42 of carbon prevents wear during this sliding movement in the guide.

Figure 7F:
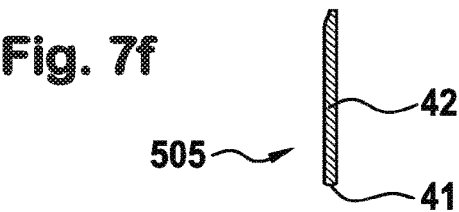

FIG. 7f shows an armature bolt 505 for use in a magnetic injector. The armature bolt 505 lies in a bore of the armature 52 and is guided therein. Its purpose is a type of regulation of the flow. The functional layer 42 of carbon prevents wear of the armature bolt 505 during sliding in the guide.

Figure 7G:
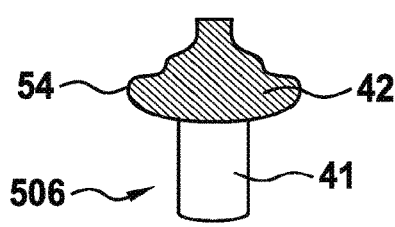

FIG. 7g shows a valve bolt 506 for use in a piezo injector. The valve bolt 506 is part of the central valve for indirect control of the nozzle needle 501. The valve bolt 506 is seated in a valve piece having a seat. When the sealing position 54 of the valve bolt 506 engages in the seat, the latter is sealed. By movement of the valve bolt 506, and therefore also of the sealing position 54, pressure is alternately built up and reduced. In this way, the movement of the nozzle needle 501 is controlled. The functional layer 42 of carbon on the sealing position 54 prevents premature wear of this sealing position 54 when engaging in the valve seat.

The invention claimed is:

1. A method (18, 19, 20, 21) for the quality control of a component (4, 4a, 4b, 4c, 4d, i, j, k), the method comprising:
heating the component (4, 4a, 4b, 4c, 4d, i, j, k) with an energy source (5, 5c, 5d), wherein an intensity of the energy source (5, 5c, 5d) is modulated with a first selected frequency between 25 and 400 Hz;
measuring the amplitude A, the phase $\varphi$, or both the amplitude A and phase $\varphi$ of a heat wave (81) emitted by the component (4, 4a, 4b, 4c, 4d, i, j, k), wherein the heat wave (81) is modulated with the first selected frequency;
evaluating the grain size d of the material of which the component (4, 4a, 4b, 4c, 4d, i, j, k) is made from the amplitude A, the phase $\varphi$, or both the amplitude A and phase $\varphi$ when the heat wave (81) is modulated with the first selected frequency;
heating the component (4, 4a, 4b, 4c, 4d, i, j, k) with the energy source (5, 5c, 5d), wherein the intensity of the energy source (5, 5c, 5d) is modulated with a second selected frequency between 600 and 2000 Hz;
measuring the amplitude A, the phase $\varphi$, or both the amplitude A and phase $\varphi$ of a heat wave (81) emitted by the component (4, 4a, 4b, 4c, 4d, i, j, k), wherein the heat wave (81) is modulated with the second selected frequency; and
evaluating the adhesion properties F of a functional layer (42) applied on the component (4, 4a, 4b, 4c, 4d, i, j, k) from the amplitude A, the phase $\varphi$, or both the amplitude A and phase $\varphi$ when the heat wave (81) is modulated with the second selected frequency.

2. The method (18, 19, 20, 21) as claimed in claim 1, characterized in that the temperature of the component (4, 4a, 4b, 4c, 4d, i, j, k) is modulated periodically on the basis of two different basic temperatures $T_1$ and $T_2$, and in that amplitudes $A(T_1)$ and $A(T_2)$, the phases $\varphi(T_1)$ and $\varphi(T_2)$, or both the amplitudes $A(T_1)$ and $A(T_2)$ and the phases $\varphi(T_1)$ and $\varphi(T_2)$ are registered (20) for the two basic temperatures $T_1$ and $T_2$.

3. The method (18, 19, 20, 21) as claimed in claim 1, characterized in that the absolute and/or relative difference $\Delta A$ between the $A(\omega_1)$, $A(\omega_2)$ and/or $A(\omega_1 \pm \omega_2)$ and/or the absolute and/or relative difference $\Delta \varphi$ between phases $\varphi(\omega_1)$, $\varphi(\omega_2)$ and/or $\varphi(\omega_1 \pm \omega_2)$ are incorporated into the evaluation (21) of the sought adhesion properties F or the sought grain size d.

4. The method (18, 19, 20, 21) as claimed in claim 1, characterized in that at least one reference value $A_R$ for the amplitude A and/or at least one reference value $\varphi_R$ for the phase $\varphi$ of the heat wave (81) is initially determined (20) on a component (4, 4a, 4b, 4c, 4d, i, j, k) for which the grain size d and/or the adhesion properties F are known, and in that the grain size d and/or the adhesion properties F are subsequently evaluated (21) for at least one further component (4, 4a, 4b, 4c, 4d, i, j, k) from the comparison of the amplitude A and/or phase $\varphi$ determined on this component (4, 4a, 4b, 4c, 4d, i, j, k) with the reference value $A_R$ and/or $\varphi_R$.

5. The method (18, 19, 20, 21) as claimed in claim 1, characterized in that the amplitude A and/or the phase $\varphi$ is determined (20) under identical conditions on a multiplicity of nominally identically manufactured components (4a, 4b, 4c, 4d, i, j, k), and an absolute or relative deviation $\Delta A$ of the amplitude $A(i)$ determined on one component (i) and/or an absolute or relative deviation $\Delta \varphi$ of the phase $\varphi(i)$ from a mean value or median over all the components (4a, 4b, 4c, 4d, i, j, k), which exceeds a predetermined threshold value S2, is evaluated (21) as an indication that the component i deviates significantly from the other components (4a, 4b, 4c, 4d, i, j, k) in respect of the grain size d and/or the adhesion properties F.

6. The method (18, 19, 20, 21) as claimed in claim 1, characterized in that a frequency co is selected at which the absolute or relative difference between the amplitudes $A(j)$ and $A(k)$ ($\Delta A$) and/or between the phases $\varphi(j)$ and $\varphi(k)$ ($\Delta \varphi$) determined on two components (j) and (k) which are known to have different grain sizes and/or adhesion properties is maximal and/or exceeds a predetermined threshold value S3.

7. An apparatus (100) for quality control of a component (4, 4a, 4b, 4c, 4d, i, j, k), the apparatus comprising:

at least one laser (5c, 5d) having an intensity and for local heating of the component (4, 4a, 4b, 4c, 4d, *i, j, k*), wherein the laser is configured to modulate the intensity with a selected frequency;

at least one frequency-sensitive detector (5a, 5b) for measuring the amplitude A, the phase φ, or both the amplitude A and the phase φ of a heat wave (81) by the component (4, 4a, 4b, 4c, 4d, *j, k*);

a comparator (6a, 6b) configured to evaluate the grain size d of the material of which the component (4, 4a, 4b, 4c, 4d, *i, j, k*) is made from the amplitude A, the phase φ or both the amplitude A and the phase φ when the selected frequency is between 25 and 400 Hz, and evaluate the adhesion properties F of the functional layer (42) applied on the component (4, 4a, 4b, 4c, 4d, *i, j, k*) from the amplitude A, the phase φ, or both the amplitude A and the phase y when the selected frequency is between 600 and 2000 Hz, and means for modifying the basic temperature of the component (4, 4a, 4b, 4c, 4d, *i, j, k*) from a first value $T_1$ to a second value $T_2$ in such a way that congruent regions on the surface (4', 4a', 4b', 4c', 4d', *j', k'*) of the component (4, 4a, 4b, 4c, 4d, *i, j, k*) are respectively locally heated (19) on the basis of the two basic temperatures $T_1$ and $T_2$.

8. The apparatus as claimed in claim 7, characterized in that a Peltier element (2a, 2b, 2c, 2d) and/or a hot and/or cold bath (3a, 3b, 3c, 3d) is provided as means for modifying the basic temperature of the component (4, 4a, 4b, 4c, 4d, *i, j, k*).

\* \* \* \* \*